(12) United States Patent
Kanehara

(10) Patent No.: US 9,848,145 B2
(45) Date of Patent: Dec. 19, 2017

(54) IMAGING DEVICE INCLUDING PIXELS

(71) Applicant: Panasonic Intellectual Property Management Co., Ltd., Osaka (JP)

(72) Inventor: Hidenari Kanehara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/166,143

(22) Filed: May 26, 2016

(65) Prior Publication Data

US 2016/0360132 A1 Dec. 8, 2016

(30) Foreign Application Priority Data

Jun. 8, 2015 (JP) .................................. 2015-115501

(51) Int. Cl.
*H04N 5/363* (2011.01)
*H04N 5/374* (2011.01)
*H04N 5/376* (2011.01)
*H04N 5/378* (2011.01)
*H01L 27/146* (2006.01)
*H04N 5/3745* (2011.01)

(52) U.S. Cl.
CPC ............. *H04N 5/363* (2013.01); *H04N 5/378* (2013.01); *H04N 5/3745* (2013.01); *H04N 5/3765* (2013.01)

(58) Field of Classification Search
CPC ...... H04N 5/363; H04N 5/3745; H04N 5/378; G04N 5/3765; H01L 27/14665; H01L 27/14692

USPC ............ 348/230.1, 300, 294, 308; 250/208.1
See application file for complete search history.

(56) References Cited

U.S. PATENT DOCUMENTS 6,777,660 B1 * 8/2004 Lee .................... H01L 27/14609
250/208.1
9,270,905 B2 * 2/2016 Ogura ..................... H04N 5/335
(Continued)

FOREIGN PATENT DOCUMENTS

JP 2007-208364 8/2007
JP 2012-510148 4/2012
(Continued)

*Primary Examiner* — Tuan Ho
*Assistant Examiner* — Marly Camargo
(74) *Attorney, Agent, or Firm* — McDermott Will & Emery LLP

(57) ABSTRACT

An imaging device includes. a first terminal to which a first voltage is applied; a second terminal to which a second voltage different from the first voltage is applied; a voltage generator generating a ramp voltage which is a voltage varying with time; a first switching circuit connected to the second terminal and the voltage generator; a second switching circuit connected to the first terminal and the first switching circuit, and pixels each including a photoelectric converter generating a signal, and a signal detection circuit detecting the signal, at least one of the pixels connected to the second switching circuit. The first switching circuit selectively connects one of the second terminal and the voltage generator with the second switching circuit. The second switching circuit selectively connects one of the first voltage terminal and the first switching circuit with the at least one of the pixels.

8 Claims, 11 Drawing Sheets

(56) References Cited

U.S. PATENT DOCUMENTS

| | | | |
|---|---|---|---|
| 2004/0046101 A1* | 3/2004 | Nakamura | H01L 27/14643 250/200 |
| 2011/0227632 A1 | 9/2011 | Lotto et al. | |
| 2011/0242381 A1* | 10/2011 | Sakakibara | H04N 5/355 348/301 |
| 2013/0341491 A1 | 12/2013 | Hirose et al. | |
| 2015/0256777 A1 | 9/2015 | Ishii et al. | |
| 2016/0190188 A1* | 6/2016 | Murakami | H01L 27/14609 250/214 A |
| 2016/0227135 A1* | 8/2016 | Matolin | H04N 3/155 |

FOREIGN PATENT DOCUMENTS

| | | |
|---|---|---|
| WO | 2012/117670 | 9/2012 |
| WO | 2014/083730 | 6/2014 |

* cited by examiner

IMAGING DEVICE INCLUDING PIXELS

BACKGROUND

1. Technical Field

The present disclosure relates to an imaging device.

2. Description of the Related Art

Digital cameras (digital video cameras or digital still cameras) are widely used in various fields. As is well known, digital cameras use imaging devices, such as charge coupled device (CCD) imaging devices and complementary metal oxide semiconductor (CMOS) imaging devices. These imaging devices have photoelectric conversion elements (also referred to as "photoelectric converter") typically represented by photodiodes.

Other than imaging devices using photodiodes, imaging devices using photoelectric conversion layers made of, for example, amorphous silicon or an organic material have been also proposed. For example, International Publication No. 2014/083730 discloses a stacked imaging device having a photoelectric conversion layer. In such a stacked imaging device, transistors for reading out electrical signals from individual pixels, such as amplifying transistors and selection transistors, are formed on a semiconductor substrate. The photoelectric conversion layer is disposed on an interlayer insulator formed so as to cover these transistors. The photoelectric conversion layer is electrically connected to the circuitry on the semiconductor substrate by metal lines or metal layers provided in the interlayer insulator. In a stacked imaging device, the photoelectric conversion layer that generates signal charge is located above the semiconductor substrate. Consequently, compared to structures in which various transistors for signal detection and photodiodes are formed on the same semiconductor substrate, stacked structures have the advantage of easily providing a sufficient light receiving area. This makes stacked imaging devices advantageous in achieving higher definition.

This advantage comes with the tradeoff that stacked imaging devices do not allow kTC noise (also called "reset noise"), which is noise introduced by the reset action, to be removed by a simple application of correlated double sampling. This is due to the presence of metal lines or metal layers between the photoelectric conversion layer and the circuitry on the substrate in such a stacked imaging device, making complete signal charge transfer to the floating diffusion difficult. In the imaging device disclosed in International Publication No. 2014/083730, a feedback loop is formed which negatively feeds back the output of a signal readout circuit to the source or drain of a reset transistor in each pixel, and further, a voltage that increases its potential with time is supplied to the gate of the reset transistor. In this way, the imaging device disclosed in International Publication No. 2014/083730 cancels kTC noise.

SUMMARY

Reduction of noise such as kTC noise is desired in the field of imaging devices.

One non-limiting and exemplary embodiment provides an imaging device described below.

In one general aspect, the techniques disclosed here feature an imaging device including a first terminal to which a first voltage is applied; a second terminal to which a second voltage different from the first voltage is applied; a voltage generator generating a ramp voltage which is a voltage varying with time; a first switching circuit connected to the second terminal and the voltage generator; a second switching circuit connected to the first terminal and the first switching circuit, and pixels each including a photoelectric converter generating a signal, and a signal detection circuit detecting the signal, at least one of the pixels connected to the second switching circuit. The first switching circuit selectively connects one of the second terminal and the voltage generator with the second switching circuit. The second switching circuit selectively connects one of the first voltage terminal and the first switching circuit with the at least one of the pixels.

It should be noted that general or specific embodiments may be implemented as an element, a device, a system, an integrated circuit, and a method. Further, general or specific embodiments may be implemented as any selective combination of an element, a device, a system, an integrated circuit, and a method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
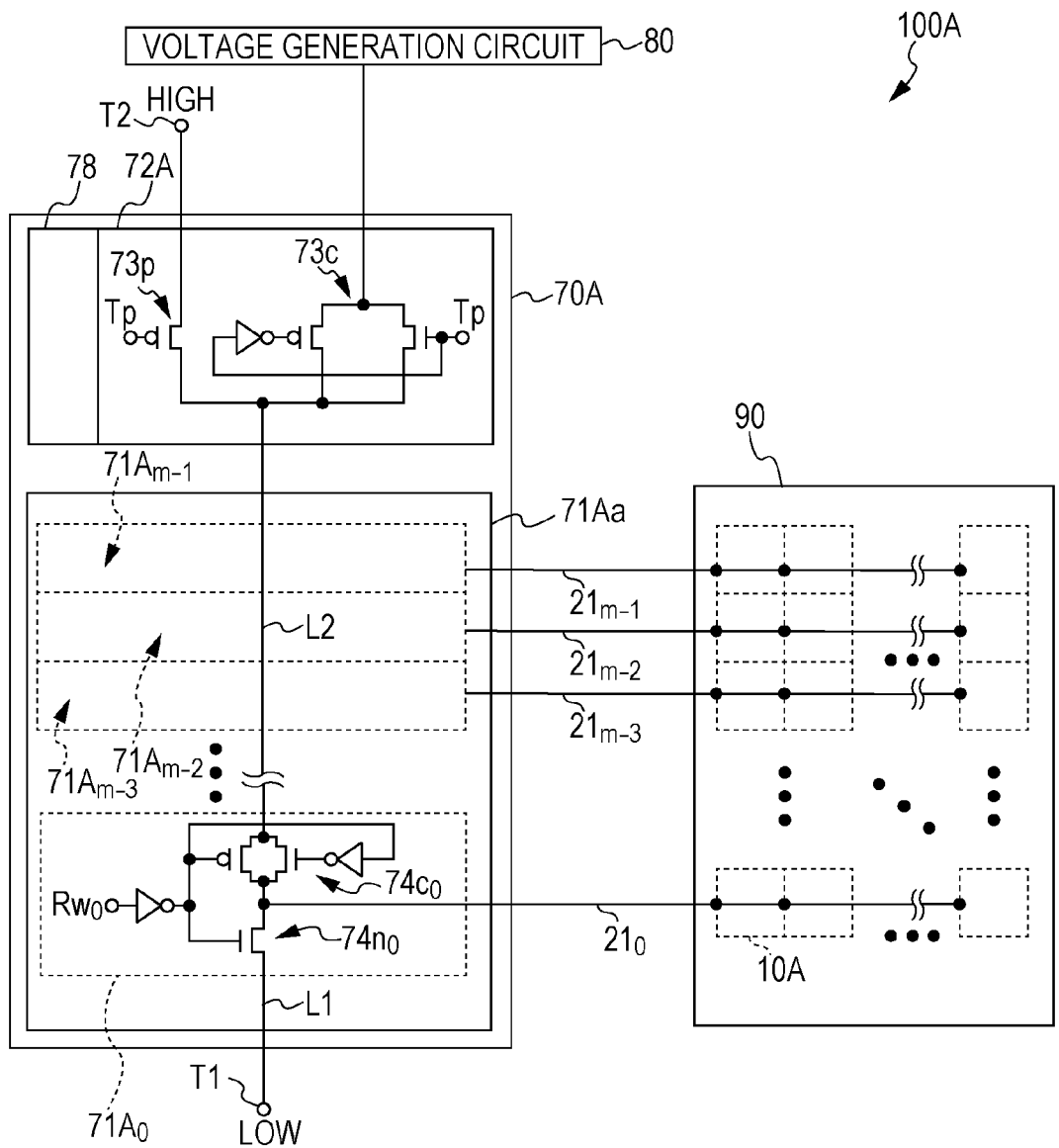
FIG. 1 illustrates an exemplary configuration of an imaging device according to a first embodiment of the present disclosure.

Underlying Knowledge Forming Basis of the Present Disclosure

Before describing embodiments of the present disclosure, the underlying knowledge forming the basis of the present disclosure will be first described.

Generally, pixels in an imaging device are driven and controlled using a plurality of voltages of different magnitudes. For example, in a CMOS imaging device, one of a LOW voltage and a HIGH voltage is selectively supplied to each pixel to control the ON and OFF states of transistors in the pixel.

In some implementations, pixels in an imaging device are driven and controlled using a third voltage different from a LOW voltage and a HIGH voltage in addition to these voltages. For example, in the imaging device disclosed in International Publication No. 2014/083730 mentioned above, one of the following voltages is selectively supplied to the gate of a reset transistor: a HIGH level voltage that causes the reset transistor to turn on, a LOW level voltage that causes the reset transistor to turn off, and a third voltage that changes from the LOW level toward the HIGH level with time. Such a HIGH level voltage, a LOW level voltage, and a third voltage are supplied to a desired pixel via a row signal line connected to the gate of the reset transistor. Such a row signal line is provided for each row in a pixel array including a plurality of pixels arranged in, for example, matrix form.

One of a LOW voltage, a HIGH voltage, and a third voltage may be selectively applied to a row signal line as follows. For example, a first voltage line, a second voltage line, and a third voltage line are provided to respectively receive supply of a LOW voltage, a HIGH voltage, and a third voltage, and one of the first to third voltage lines is selectively connected to the row signal line. For example, a switching element such as a transistor may be provided between the first voltage line and the row signal line, between the second voltage line and the row signal line, and between the third voltage line and the row signal line, thus allowing one of the first to third voltage lines to be selectively connected to the row signal line.

Transistors have parasitic capacitances between the control terminal and other terminals. For example, field effect transistors (FETs) have a gate-source parasitic capacitance and a gate-drain parasitic capacitance. Consequently, even when the transistor between the row signal line and the first voltage line, and the transistor between the row signal line and the second voltage line are OFF, coupling through these parasitic capacitances may sometimes cause noise on the first voltage line or the second voltage line (for example, power noise) to mix into the third voltage. In particular, for configurations designed to cancel kTC noise using a third voltage that varies with time as disclosed in International Publication No. 2014/083730, such mixing of noise into the third voltage due to capacitive coupling may make it difficult to provide sufficient noise cancellation. Thus, mixing of noise into the third voltage may adversely affect image quality.

As described above, each row signal line that supplies a third voltage to a pixel is provided for each corresponding row in the pixel array. This means that a switching circuit for selectively connecting one of the first voltage line, the second voltage line, and the third voltage line to each row signal line may be also provided for each individual row in the pixel array. In such a configuration, the number of transistors existing between a HIGH voltage source (or the LOW voltage source) and each row signal line is different for each row. For example, the greater the distance between a HIGH voltage source and a row signal line of interest, the greater the number of transistors between the HIGH voltage source and the row signal line.

As the number of transistors between the HIGH voltage source (or the LOW voltage source) and the row signal line increases, the noise due to capacitive coupling adds up and mixing of noise into the third voltage increases. The second voltage line (or the first voltage line), and the third voltage line to which a third voltage is supplied, typically extend in the column direction of the pixel array. Consequently, as the distance between the HIGH voltage source (or the LOW voltage source) and the row signal line increases, the line-to-line coupling between the second voltage line (or the first voltage line) and the third voltage line also increases, and mixing of noise into the third voltage increases.

That is, pixels having a connection with row signal lines located at greater distances from the HIGH voltage source (or the LOW voltage source) are comparatively more susceptible to the influence of noise present on the second voltage line (or on the first voltage line). This may result in different noise cancellation effects for different rows in the pixel array, leading to so-called shading in the obtained image. Shading refers to a phenomenon in which color unevenness and/or brightness unevenness develops between the central and peripheral regions of an image.

Extensive studies conducted in the light of the above knowledge have led the inventor to complete the imaging device according to the present disclosure.

A general description of an aspect of the present disclosure is given below.

Item 1

An imaging device including a first terminal to which a first voltage is applied; a second terminal to which a second voltage different from the first voltage is applied; a voltage generator generating a ramp voltage which is a voltage varying with time; a first switching circuit connected to the second terminal and the voltage generator; a second switching circuit connected to the first terminal and the first switching circuit, and pixels each including a photoelectric converter generating a signal, and a signal detection circuit detecting the signal, at least one of the pixels connected to the second switching circuit, wherein the first switching circuit selectively connects one of the second terminal and the voltage generator with the second switching circuit, and the second switching circuit selectively connects one of the first voltage terminal and the first switching circuit with the at least one of the pixels.

The configuration according to Item 1 makes it possible to reduce mixing of noise into the ramp voltage applied to the third voltage line.

Item 2

The imaging device according to Item 1, wherein the second voltage is higher than the first voltage.

The configuration according to Item 2 allows the same voltage line to serve as both the voltage line to which a HIGH voltage is applied, and the voltage line to which a ramp voltage is applied.

Item 3

The imaging device according to Item 1 and 2, wherein the pixels each further include a reset circuit initializing the signal.

The configuration according to Item 3 enables initialization of a signal generated by the photoelectric converter.

Item 4

The imaging device according to Item 3, further comprising a feedback circuit that negatively feeds back an output of the signal detection circuit to the photoelectric converter through a feedback loop, wherein the reset circuit constitutes a part of the feedback loop.

The configuration according to Item 4 enables reduction of thermal noise.

Item 5

The imaging device according to Item 4, wherein the reset circuit includes a first transistor having an input terminal, an output terminal and a control terminal, one of the input terminal and the output terminal is connected to the photoelectric converter, and the control terminal is connected to the second switching circuit.

The configuration according to Item 5 enables reduction of thermal noise by use of the ramp voltage.

Item 6

The imaging device according to Item 3, further comprising a feedback circuit that negatively feeds back an output of the signal detection circuit to the photoelectric converter through a feedback loop, wherein the feedback circuit includes a first transistor constituting a part of the feedback loop, the first transistor having a control terminal connected to the second switching circuit, and the reset circuit includes a second transistor having an input terminal and an output terminal, one of the input terminal and the output terminal connected to the photoelectric converter.

The configuration according to Item 6 enables reduction of thermal noise by use of the ramp voltage. The configuration according to Item 6 also allows any given voltage to be applied to the charge-storage node as a reference voltage used for reset operation.

Item 7

The imaging device according to any one of Items 1 to 6, wherein the ramp voltage is a voltage that increases or decreases with time between the first voltage and the second voltage.

The configuration according to Item 7 allows noise cancellation to be executed irrespective of variations in threshold among individual feedback transistors.

Item 8

An imaging device including a plurality of pixels each including a photoelectric converter and a signal detector that detects a signal generated by the photoelectric converter, a voltage generator that generates a ramp voltage, a first voltage line to which a first voltage is applied, a second voltage line to which a second voltage higher than the first voltage is applied, a third voltage line connected to the voltage generator, a plurality of switching circuits electrically connected to the first voltage line, the second voltage line, and the third voltage line, and a plurality of fourth voltage lines that each connect one of the switching circuits with at least one of the pixels corresponding to the one switching circuit, in which each of the switching circuits selectively establishes an electrical connection between one of the first voltage line, the second voltage line, and the third voltage line with a corresponding one of the fourth voltage lines.

The configuration according to Item 8 allows for faster operation of the imaging device.

Item 9

The imaging device according to any one of Items 1 to 8, in which the pixels are arranged in a matrix, the imaging device further includes a vertical scanning circuit connected to each of the pixels, and the first voltage line and the second voltage line are disposed within the vertical scanning circuit.

The configuration according to Item 9 allows at least one of the first voltage line and the second voltage line to have a line width greater than the line width of the third voltage line, thus enabling formation of the first voltage line and/or second voltage line with low resistance. Further, the configuration according to Item 9 makes it possible to minimize an increase in the size of the peripheral circuit.

Item 10

An imaging device including a first voltage line that receives application of a first voltage, a voltage generator that generates a ramp voltage, the ramp voltage varying in value with time, a first switching circuit connected to the voltage generator, a second voltage line connected to the first switching circuit, a second switching circuit connected to the first voltage line and the second voltage line, a third voltage line connected to the second switching circuit, and a plurality of pixels each connected to the third voltage line, the pixels each including a photoelectric converter, and a signal detector that detects a signal generated by the photoelectric converter, in which the first switching circuit switches whether to apply the ramp voltage to the second voltage line, or to apply a second voltage different from the first voltage to the second voltage line, and the second switching circuit switches whether to electrically connect the first voltage line with the third voltage line, or to electrically connect the second voltage line with the third voltage line.

Item 11

The imaging device according to Item 10, in which each of the pixels includes a first transistor having an input terminal, an output terminal, and a control terminal, one of the input terminal and the output terminal is connected to the photoelectric converter, and the control terminal is connected to the third voltage line.

Item 12

The imaging device according to Item 9 or 10, in which the ramp voltage is a voltage that generally increases or generally decreases with time between the first voltage and the second voltage.

Hereinafter, embodiments of the present disclosure will be described in detail with reference to the drawings. Embodiments described below each represent a general or specific example. The numeric values, shapes, materials, components, the arrangements and connections of components, steps, the orders of steps, and so on indicated in the following description of embodiments are for illustrative purposes only and not intended to limit the scope of the present disclosure. Various aspects of the present disclosure discussed herein may be combined as long as these aspects do not contradict each other. Those components in the following description of embodiments which are not cited in the independent claim representing the most generic concept will be described as optional components. In the following description, components having substantially the same function will be sometimes denoted by the same symbols to avoid repetitive description.

First Embodiment

FIG. 1 illustrates an exemplary configuration of an imaging device according to a first embodiment of the present disclosure. An imaging device 100A illustrated in FIG. 1 has a pixel array 90 including a plurality of unit pixel cells 10A, and a peripheral circuit. As will be described later, each of the unit pixel cells 10A includes a photoelectric converter and a signal detection circuit.

The unit pixel cells 10A are arranged either two-dimensionally or one-dimensionally to define a photosensitive region (pixel region). FIG. 1 illustrates an exemplary configuration in which the unit pixel cells 10A are arranged in the row direction and the column direction. The terms row direction and column direction as used herein respectively refer to directions in which rows and columns extend. That is, the vertical direction in the plane of FIG. 1 is the column direction, and the horizontal direction in the plane of FIG. 1 is the row direction. Hereinafter, a given one of the unit pixel cells 10A in the pixel array 90 will be sometimes indicated by a pair (i, j) of row number i and column number j, where i=0, 1, . . . , m−1, and j=0, 1, . . . , n−1 (m and n are natural numbers equal to or greater than 1). For example, in FIG. 1, the unit pixel cell 10A at the lower left corner of the pixel array 90 is represented by coordinates (0, 0), and the unit pixel cell 10A at the upper right corner is represented by coordinates (m−1, n−1).

The peripheral circuit of the imaging device 100A includes a vertical scanning circuit (also referred to as "row scanning circuit") 70A having an electrical connection with each of the unit pixel cells 10A, and a voltage generation circuit 80. The peripheral circuit may include other elements, such as a load circuit, a column signal processing circuit, and a horizontal signal readout circuit.

The vertical scanning circuit 70A has a first terminal T1 that receives supply of a first voltage (for example, a LOW voltage of about 0 V or −1 V) from a first voltage source (not illustrated), and a second terminal T2 that receives supply of a second voltage (for example, a HIGH voltage of about 4 V) from a second voltage source (not illustrated). That is, during operation of the imaging device 100A, the vertical scanning circuit 70A receives supply of a LOW voltage and a HIGH voltage respectively from the first voltage source and the second voltage source.

The vertical scanning circuit 70A has a connection with the voltage generation circuit 80. When the imaging device 100A is in operation, the voltage generation circuit 80 supplies a ramp voltage to the vertical scanning circuit 70A. The voltage generation circuit 80 may be any known circuit capable of outputting a ramp voltage. The voltage generation circuit 80 may be configured to, for example, convert an input voltage into a ramp voltage and output the ramp voltage. The term "ramp voltage" as used herein means a voltage that varies with time. The "ramp voltage" may be a voltage that generally increases or generally decreases with time. The term "ramp voltage" as used herein may be, for example, a voltage that linearly increases or linearly decreases, a voltage that changes in a stepwise manner, or a voltage that increases or decreases on average while fluctuating.

In the exemplary configuration illustrated in FIG. 1, the vertical scanning circuit 70A includes a row driver array 71Aa, a voltage switching circuit 72A, a control circuit 78, a first voltage line L1, and a second voltage line L2. In this example, the first voltage line L1 and the second voltage line L2 are respectively connected to the first terminal T1 and the voltage switching circuit 72A. In this example, a LOW voltage is applied to the first voltage line L1 when the imaging device 100A is in operation.

As illustrated in FIG. 1, the voltage switching circuit 72A is connected to the voltage generation circuit 80 and the second terminal T2. That is, when the imaging device 100A is in operation, the voltage switching circuit 72A receives supply of a HIGH voltage and a ramp voltage. The voltage switching circuit 72A is capable of switching whether to apply a HIGH voltage to the second voltage line L2, or to apply a ramp voltage to the second voltage line L2. In this example, the voltage switching circuit 72A has a CMOS switch 73c connected between the voltage generation circuit 80 and the second voltage line L2, and a pMOS switch 73p connected between the second terminal T2 and the second voltage line L2.

The CMOS switch 73c and the pMOS switch 73p in the voltage switching circuit 72A operate in a complementary manner. That is, when the CMOS switch 73c is ON, the pMOS switch 73p is OFF, and when the CMOS switch 73c is OFF, the pMOS switch 73p is ON. Accordingly, when the CMOS switch 73c is ON, a connection is established between the voltage generation circuit 80 and the second voltage line L2, and a ramp voltage is supplied to the second voltage line L2 via the voltage switching circuit 72A. When the CMOS switch 73c is OFF, the pMOS switch 73p turns on to establish a connection between the second terminal T2 and the second voltage line L2, and a HIGH voltage is supplied to the second voltage line L2. The ON and OFF states of the CMOS switch 73c and the pMOS switch 73p are determined by, for example, whether a control signal Tp supplied from the control circuit 78 is at HIGH level or LOW level.

The row driver array 71Aa includes a number of row drivers $71A_i$ equal to the number of rows (for example, several thousand rows) of the unit pixel cells 10A in the pixel array 90. That is, each of the row drivers $71A_i$ is provided for each corresponding row of the unit pixel cells 10A in the pixel array 90. As illustrated in FIG. 1, each of the row drivers $71A_i$ is connected by a feedback control line $21_i$ to at least one of the unit pixel cells 10A belonging to the i-th row. The subscript i is an index to distinguish between different row drivers. For example, a row driver $71A_0$ is connected by a feedback control line $21_0$ to n unit pixel cells 10A located at coordinates (0, 0) to (0, n−1).

In this example, each of the row drivers $71A_i$ is connected to the second voltage line L2, which receives application of a HIGH voltage or a ramp voltage when the imaging device 100A is in operation, and the first voltage line L1, which receives application of a LOW voltage when the imaging device 100A is in operation. That is, when the imaging device 100A is in operation, each of the row drivers $71A_i$ either receives supply of a HIGH voltage and a LOW voltage, or receives supply of a ramp voltage and a LOW voltage, depending on the ON or OFF state of the CMOS switch 73c and the pMOS switch 73p of the voltage switching circuit 72A.

Each of the row drivers $71A_i$ is capable of switching voltages applied to the corresponding feedback control line $21_i$. In this example, each of the row drivers $71A_i$ has a CMOS switch $74c_i$ connected between the voltage switching circuit 72A and the feedback control line $21_i$, and an nMOS switch $74n_i$ connected between the first terminal T1 and the feedback control line $21_i$. Now, drawing attention to, for example, the row driver $71A_0$, the row driver $71A_0$ has CMOS switch $74c_0$ and an nMOS switch $74n_0$ as illustrated in FIG. 1.

The CMOS switch $74c_i$ and the nMOS switch $74n_i$ in each of the row drivers $71A_i$ operate in a complementary manner. When the CMOS switch $74c_i$ is ON, a connection is established between the second voltage line L2 and the feedback control line $21_i$. Accordingly, depending on whether the control signal Tp supplied to the voltage switching circuit 72A is at HIGH level or LOW level, either a HIGH voltage or a ramp voltage is supplied to the feedback control line $21_i$. When the CMOS switch $74c_i$ is OFF, the nMOS switch $74n_i$ is ON, and a connection is established between the first voltage line L1 and the feedback control line $21_i$, causing a LOW voltage to be supplied to the feedback control line $21_i$. The ON and OFF states of the CMOS switch $74c_i$ and the nMOS switch $74n_i$ are determined by, for example, whether a control signal $Rw_i$ supplied from the control circuit 78 is at HIGH level or LOW level.

As described above, in this example, a common voltage line is used to supply a HIGH voltage, and a ramp voltage that varies in value with time. Further, in the exemplary configuration illustrated in FIG. 1, the voltage switching circuit 72A is disposed outside the row driver array 71Aa, and one of a HIGH voltage and a ramp voltage is selectively applied to each of the row drivers $71A_i$. This eliminates the need to provide, in each of the row drivers $71A_i$ corresponding to each individual row in the pixel array 90, a switching element to switch whether to connect a voltage line that supplies a HIGH voltage to the feedback control line $21_i$, or to connect a voltage line that supplies a ramp voltage to the feedback control line $21_i$. This makes it possible to reduce mixing of noise into the ramp voltage due to capacitive coupling through transistors. Since a voltage line for supplying a HIGH voltage, and a voltage line for supplying a ramp voltage do not need to be provided separately, line-to-line coupling between these voltage lines is also reduced. For example, compared to when a voltage switching circuit for switching whether to supply a HIGH voltage or a ramp voltage to a voltage line connecting each row driver with at least one corresponding unit pixel cell is disposed for each of several thousands of row drivers, this configuration allows capacitive coupling through transistors and line-to-line coupling to be respectively reduced to approximately 1/100 and approximately 1/1000.

As described above, the first embodiment of the present disclosure enables reductions in capacitive coupling and line-to-line coupling, thus allowing for reduced mixing of noise into a ramp voltage. Less noise into a ramp voltage leads to more effective noise cancellation. Consequently, shading can be minimized. Specific examples of noise cancellation will be described later.

Further, the first embodiment of the present disclosure makes it possible to reduce the number of voltage lines and also the number of switching elements in each of the row drivers, leading to reduced row driver area. The reduced number of voltage lines also contributes to increased freedom of wiring design. That is, the configuration proves advantageous in achieving increased definition and increased functionality. Even when the voltage switching circuitry for switching whether to supply a HIGH voltage or a ramp voltage to each individual row driver is concentrated at one location, the increase in electric power due to the concentration of the voltage switching circuitry at one location is only on the order of, for example, 20 μW to 30 μW.

In the exemplary configuration illustrated in FIG. 1, the peripheral circuit of the imaging device 100A includes a single vertical scanning circuit 70A. However, the peripheral circuit may include two or more vertical scanning circuits. For example, one vertical scanning circuit may be disposed on the left and right, or above and below the pixel array.

Exemplary Circuit Configuration of Unit Pixel Cell

Hereinafter, a specific exemplary circuit configuration of each unit pixel cell in the pixel array 90 will be described.

Figure 2:
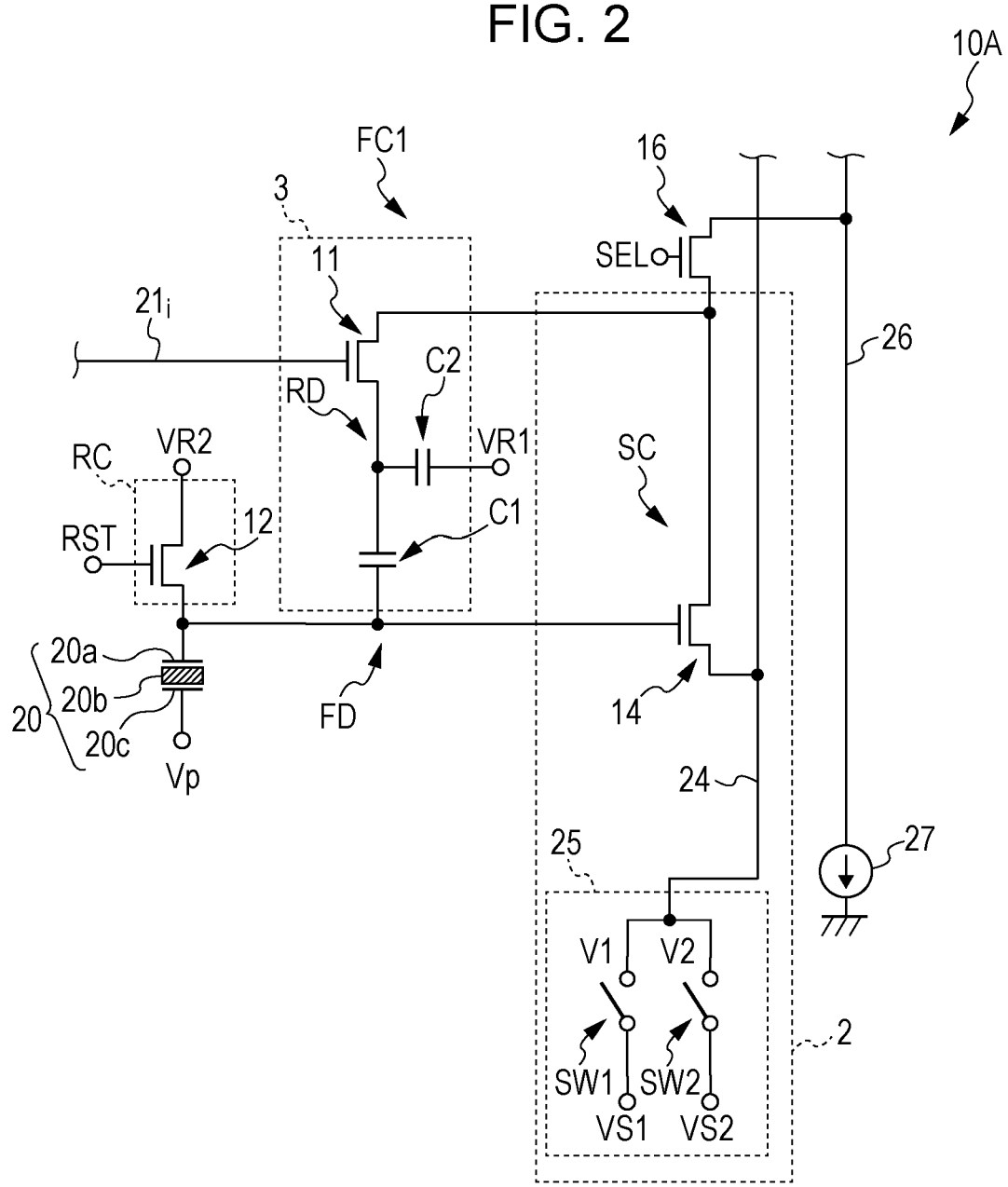
FIG. 2 illustrates an exemplary circuit configuration of a unit pixel cell.

FIG. 2 illustrates an exemplary circuit configuration of a unit pixel cell. FIG. 2 illustrates a schematic representation of one of the unit pixel cells 10A included in the i-th row in the pixel array 90.

In the exemplary configuration illustrated in FIG. 2, the unit pixel cell 10A has a photoelectric converter 20, and a signal detection circuit SC including an amplifying transistor 14. In this example, the signal detection circuit SC includes an address transistor 16. The amplifying transistor 14 and the address transistor 16 are typically FETs formed on a semiconductor substrate. Unless otherwise specifically stated, the following description will be directed to a case in which N-channel MOSs are used as transistors. The semiconductor substrate is not limited to a substrate made entirely of a semiconductor. The semiconductor substrate may be, for example, an insulating substrate with a semiconductor layer provided on the side of the semiconductor substrate where a photosensitive region is formed.

The photoelectric converter 20 generates an electrical signal according to light incident on the photosensitive region. The photoelectric converter 20 includes, for example, a photodiode, or a photoelectric conversion layer made of an organic material or an inorganic material such as amorphous silicon. The following description assumes that the photoelectric converter 20 has a stacked structure including a photoelectric conversion layer.

The photoelectric converter 20 is provided above a substrate (typically a semiconductor substrate) on which the amplifying transistor 14 is disposed. The photoelectric converter 20 has a pixel electrode 20a, a counter electrode 20c, and a photoelectric conversion layer 20b disposed between these electrodes. The pixel electrode 20a is made of, for example, a metal such as aluminum or copper, or polysilicon doped with impurities so as to have conductivity. Typically, the pixel electrode 20a is provided for each unit pixel cell 10A. For example, any two adjacent unit pixel cells 10A are electrically separated by a gap provided between the two unit pixel cells 10A. The pixel electrode 20a has a connection with a charge-storage node (also called "floating diffusion node") FD. The counter electrode 20c, which is an electrode disposed on the light-receiving side of the photoelectric conversion layer 20b, is made of a transparent conductive material such as ITO. When the imaging device 100A is in operation, a predetermined voltage Vp is applied to the counter electrode 20c. The counter electrode 20c and the photoelectric conversion layer 20b typically extend over two or more unit pixel cells 10A.

Hole-electron pairs are generated by photoelectric conversion. Either the holes or electrons can be collected by the pixel electrode 20a by applying voltage Vp to the counter electrode 20c. When holes are used as signal charge, a voltage of, for example, about 10 V is applied to the counter electrode 20c as the voltage Vp. Making the counter electrode 20c higher in potential than the pixel electrode 20a allows the holes to be stored in the charge-storage node FD. The following description will be directed to a case in which holes are used as signal charge. Of course, electrons may be used as signal charge.

As the voltage Vp, the same voltage may be supplied for each of the unit pixel cells 10A, or a different voltage may be supplied for each of pixel blocks including several unit pixel cells 10A. Supplying a different voltage for each pixel block allows the sensitivity of each pixel block to be varied.

The charge-storage node FD is connected with the control terminal (gate in this case) of the amplifying transistor 14. One (drain in this case) of the input terminal and output terminal of the amplifying transistor 14 is connected to a voltage switching circuit 25 via power wiring 24. The voltage switching circuit 25 includes a first switch SW1 connected to a first voltage source VS1, and a second switch SW2 connected to a second voltage source VS2. The drain of the amplifying transistor 14 and the first voltage source VS1 are connected in series via the first switch SW1. The drain of the amplifying transistor 14 and the second voltage source VS2 are connected in series via the second switch SW2. A control voltage V1 and a control voltage V2 are respectively used to control the ON/OFF action of the first switch SW1 and the ON/OFF action of the second switch SW2, thus allowing one of the first voltage source VS1 and the second voltage source VS2 to be selectively connected to the drain of the amplifying transistor 14. The voltage supplied from the first voltage source VS1 is, for example, 0 V (ground), and the voltage supplied from the second voltage source VS2 is, for example, VDD (power voltage).

The voltage switching circuit 25 may be either shared by a plurality of pixels or provided for each pixel.

The other (source in this case) of the input terminal and output terminal of the amplifying transistor 14 is connected to a vertical signal line 26 and a constant current source 27 via the address transistor 16. The vertical signal line 26 may be shared between two or more pixels. An address signal SEL is supplied to the control terminal (gate in this case) of the address transistor 16 to switch the ON and OFF states of the address transistor 16. The address signal SEL is supplied from, for example, the vertical scanning circuit 70A. With the address signal SEL at HIGH level, the address transistor 16 is turned on, and the address transistor 16, the amplifying transistor 14, and the constant current source 27 form a source follower circuit. Consequently, a signal corresponding to the charge stored in the charge-storage node FD is output to the vertical signal line 26. With the address signal SEL at LOW level, the address transistor 16 is turned off, and the amplifying transistor 14 and the vertical signal line 26 are electrically separated. In the exemplary configuration illustrated in FIG. 2, the amplifying transistor 14 and the voltage switching circuit 25 form an amplifier 2.

As illustrated in FIG. 2, the imaging device may have a reset circuit RC that initializes a signal generated by the photoelectric converter 20. In the exemplary configuration illustrated in FIG. 2, the reset circuit RC includes a reset transistor 12 whose input terminal or output terminal is connected to the photoelectric converter. In this example, one of the source and drain of the reset transistor 12 is connected to the charge-storage node FD. A predetermined voltage VR2 is applied to the other of the source and drain of the reset transistor 12 via a reset voltage line (not illustrated). The voltage VR2 is a reference voltage used in reset operation described later. The voltage VR2 may be supplied from the vertical scanning circuit 70A.

A reset signal RST is supplied to the control terminal (gate in this case) of the reset transistor 12 via a reset control line (not illustrated). When the potential of the reset signal RST is at HIGH level, the reset transistor 12 turns on, and the charge-storage node FD is reset.

The reset circuit RC may be provided for each of the unit pixel cells 10A, or may be shared between two or more unit pixel cells 10A. The term "reset circuit" as used herein means a portion that includes a switching element used to switch whether or not to apply a reference voltage used in reset operation to the charge-storage node FD, and that is connected to the charge-storage node FD. The "reset circuit" may partially include circuitry located outside the unit pixel cell.

In the exemplary configuration illustrated in FIG. 2, the imaging device has a feedback circuit FC1 that negatively feeds back the output of the signal detection circuit SC. In this example, the feedback circuit FC1 partially includes a band control circuit 3 having a feedback transistor 11 and capacitors C1 and C2. The band control circuit 3 imposes a band limitation on the output signal of the amplifier 2, and outputs the resulting signal to the charge-storage node FD. That is, in the exemplary configuration illustrated in FIG. 2, a signal read out from the charge-storage node FD is amplified by the amplifier 2, and after being subjected to band limitation in the band control circuit 3, the resulting signal is negatively fed back to the charge-storage node FD.

One of the source and drain of the feedback transistor 11 is connected to the photoelectric converter 20 via the capacitor C1. The capacitor C1 has a relatively small capacitance value. The other of the source and drain of the feedback transistor 11 is connected to the node between the amplifying transistor 14 and the address transistor 16. That is, in this example, the feedback transistor 11 constitutes a part of a feedback loop in the feedback circuit FC1. Hereinafter, the node between the feedback transistor 11 and the capacitor C1 will be sometimes referred to as reset drain node RD. The term "capacitor" as used herein means a structure including a dielectric such as an insulating film sandwiched between electrodes. The term "electrode" as used herein is not limited to electrodes made from metal but may include electrodes in a wide variety of forms, such as a polysilicon layer. The "electrode" herein may be a part of a semiconductor substrate.

The control terminal (gate in this case) of the feedback transistor 11 is connected to the feedback control line $21_i$. As described above with reference to FIG. 1, the feedback control line $21_i$ has a connection with the row driver $71A_i$ corresponding to the i-th row of the pixel array 90. Accordingly, by using the control signals Tp and $RW_i$, the voltage applied to the gate of the feedback transistor 11 via the feedback control line $21_i$ can be switched between a HIGH voltage, a LOW voltage, and a ramp voltage.

The state of the feedback transistor 11 is determined by the potential of the feedback control line $21_i$. With a HIGH voltage applied to the feedback control line $21_i$, the feedback transistor 11 is in ON state. When the feedback transistor 11 is in ON state, a feedback loop including the charge-storage node FD, the amplifying transistor 14, the feedback transistor 11, and the capacitor C1 in its path is formed. A decrease in the voltage applied to the feedback control line $21_i$ causes an increase in the resistance of the feedback transistor 11. An increase in the resistance of the feedback transistor 11 narrows the frequency band of the signal passing between the source and drain of the feedback transistor 11, thus narrowing the frequency band of the signal to be fed back. When a feedback loop is formed (in other words, when the feedback transistor 11 is not OFF), the signal output by the feedback transistor 11 is attenuated by an attenuation circuit formed by the capacitor C1 and the parasitic capacitance of the charge-storage node FD. An attenuation factor B at this time is given by B=Cc/(Cc+Cfd), where Cc is the capacitance value of the capacitor C1, and Cfd is the value of the parasitic capacitance of the charge-storage node FD. When the voltage applied to the feedback control line $21_i$ decreases and goes to LOW level, the feedback transistor 11 is turned off. That is, a feedback loop is not formed.

In the exemplary configuration illustrated in FIG. 2, the reset drain node RD is connected with the capacitor C2, which has a greater capacitance value than the capacitor C1. The capacitor C2 and the feedback transistor 11 form an RC filter circuit.

One of the electrodes of the capacitor C2, which is not connected to the reset drain node RD, has a connection with, for example, a sensitivity control line (not illustrated). The sensitivity control line receives supply of a reference voltage VR1 (for example, 0 V) from, for example, the vertical scanning circuit 70A. The potential of the sensitivity control line does not need to be fixed during operation of the imaging device. For example, a pulse voltage may be supplied to the sensitivity control line. The sensitivity control line can be used to control the potential of the charge-storage node FD.

Operation of Imaging Device

Next, exemplary operation of the imaging device 100A during signal readout will be described.

Figure 3:
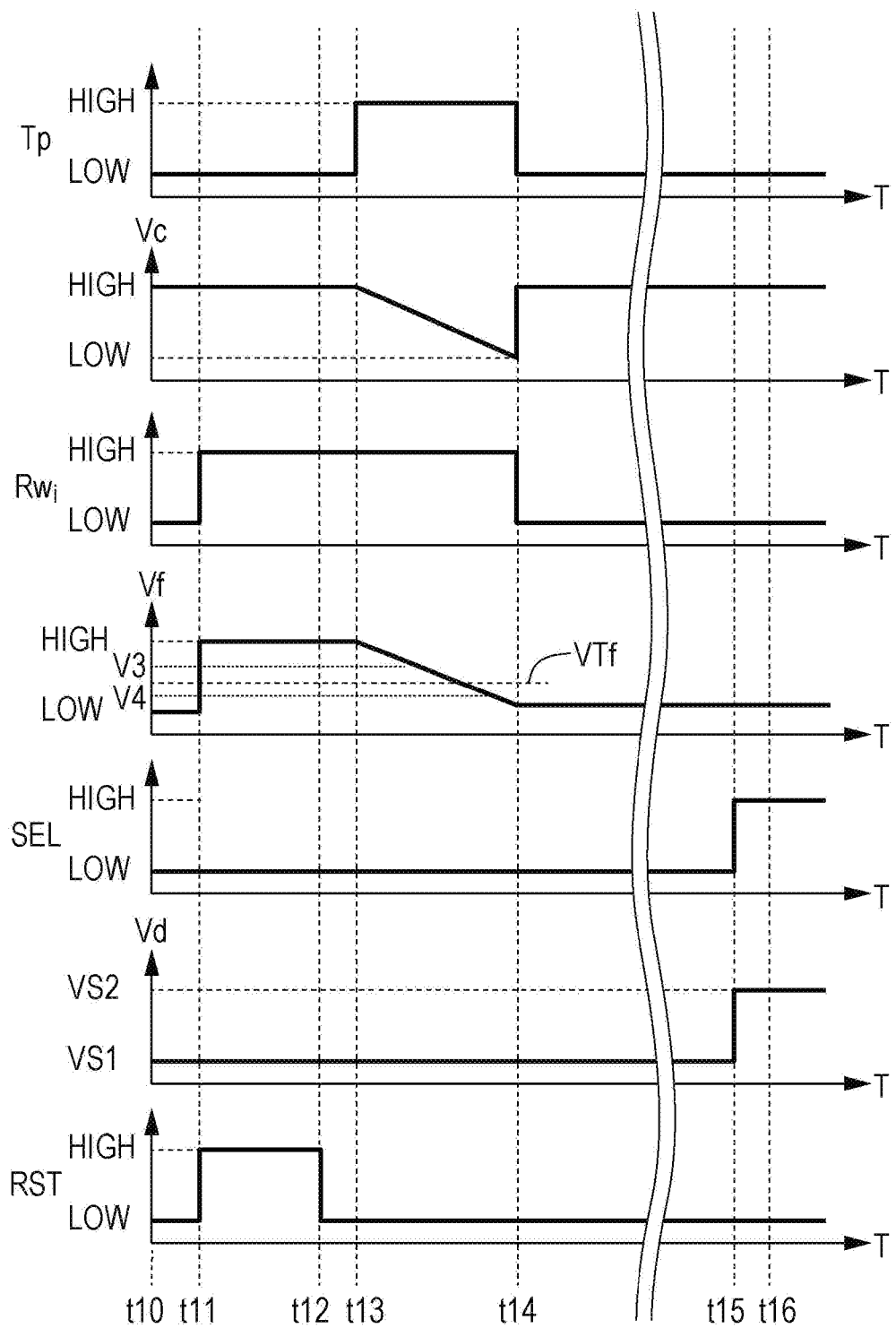
FIG. 3 is an exemplary timing chart illustrating operation of an imaging device during signal readout.

FIG. 3 is an exemplary timing chart illustrating operation of the imaging device 100A during signal readout. In FIG. 3, the horizontal axis of each graph represents time T. The vertical axes of the graphs illustrated in FIG. 3 represent, in order from top to bottom, the voltage level of the control signal Tp, the voltage level Vc of the second signal line L2, the voltage level of the control signal $Rw_i$, the voltage level Vf of the feedback control line $21_i$, the voltage level of the address signal SEL, the voltage level Vd of one (the drain in this case) of the drain and source of the amplifying transistor 14 which is connected to the voltage switching circuit 25, and the voltage level of the reset signal RST. A voltage VTf illustrated in the graph representing the voltage level Vf of the feedback control line $21_i$ is the threshold voltage of the feedback transistor 11.

In the example illustrated in FIG. 3, at time t10, the control signal Tp is at LOW level. A HIGH voltage is thus applied to the second voltage line L2. At time t10, the control signal $Rw_i$ is also at LOW level. At this time, the feedback control line $21_i$ is connected to the first voltage line L1, and a LOW voltage is applied to the gate of the feedback transistor 11.

Reset

At time t11, the potential of the address signal SEL is LOW level. At this time, the address transistor 16 is turned off, and the amplifying transistor 14 and the vertical signal line 26 are electrically separated. Further, the control signal $Rw_i$ is switched to HIGH level. Switching the control signal $Rw_i$ to HIGH level causes the second voltage line L2 to be connected to the feedback control line $21_i$ instead of the first voltage line L1, and thus a HIGH voltage is applied to the feedback control line $21_i$. Application of a HIGH voltage to the feedback control line $21_i$ turns on the feedback transistor 11, and a feedback loop is formed in the unit pixel cell 10A (see FIG. 2).

The amplification factor at this time is given by (−A×B), where (−A) is the amplification factor of the amplifier 2 ("×" represents multiplication). A designer may freely design this amplification factor so as to have an optimum value for the circuit system. Normally, "A" may be set to a numeric value greater than 1 and ranging from about several tens to several hundreds. At this time, the first switch SW1 and the second switch SW2 of the voltage switching circuit 25 are respectively turned on and off, and a voltage of, for example, 0 V is applied to the amplifying transistor 14.

Further, the reset signal RST is switched to HIGH level. This turns on the reset transistor 12, causing the potential of the charge-storage node FD to be reset to the reference potential VR2.

First Noise Reduction Period

Next, at time t12, the reset signal RST is switched to LOW level to turn off the reset transistor 12. The turn-off action of the reset transistor 12 introduces kTC noise. At turn-off of the reset transistor 12, a feedback loop with an amplification factor of (−A×B) is formed in the unit pixel cell 10A. Consequently, in the period from time t12 to time t13, the kTC noise on the charge-storage node FD introduced by the turn-off action of the reset transistor 12 is reduced to 1/(1+A×B) times. At this time, if the potential of the feedback control line $21_i$ is set so that the frequency band of the signal passing between the source and drain of the feedback transistor 11 is a first band that is a comparatively wide band, this enables fast noise reduction. The first band means a band corresponding to a HIGH level signal (the gate potential in this case). The potential of the feedback control line $21_i$ is set to HIGH level in this case, thus allowing for fast noise reduction. Herein, the frequency band of the signal passing between the source and drain of a transistor will be sometimes referred to as the operating band of the transistor.

Second Noise Reduction Period

Next, at time t13, the control signal Tp is switched to HIGH level. Switching the control signal Tp to HIGH level switches the voltage applied to the second voltage line L2 from a HIGH voltage to a ramp voltage. Since the control signal $Rw_i$ remains at HIGH level at this time, the second voltage line L2 is connected to the feedback control line $21_i$. Consequently, a ramp voltage is applied to the gate of the feedback transistor 11. In this example, a ramp voltage that generally decreases in the period from time t13 to time t14 is used. Accordingly, the voltage applied to the gate of the feedback transistor 11 decreases from HIGH level toward LOW level in the period from time t13 to time t14.

As the potential of the feedback control line $21_i$ is gradually lowered from HIGH level toward LOW level so as to cross over the threshold voltage VTf of the feedback transistor 11, the state of the feedback transistor 11 gradually changes from ON state to OFF state. In this way, in the period from time t13 to time t14, the potential of the feedback control line $21_i$ is controlled so that the feedback transistor 11 operates in a second band that is narrower than the first band. The second band means a band corresponding to a signal at intermediate level (the gate potential in this case).

Setting the second band sufficiently lower than the operating band of the amplifying transistor 14 allows for improved noise reduction, although this increases the time required to achieve sufficient noise reduction (the length of time from time t13 to time t14). That said, noise reduction is provided even when the second band is higher than the operating band of the amplifying transistor 14. Thus, a designer may freely design the second band in accordance with how much time is permitted between time t13 and time t14. The following description assumes that the second band is sufficiently lower than the operating band of the amplifying transistor 14. When the second band is sufficiently lower than the operating band of the amplifying transistor 14, thermal noise generated by the feedback transistor 11 is reduced to $1/(1+A\times B)^{1/2}$ times by the feedback circuit FC1.

At time t14, the control signal $Rw_i$ is switched to LOW level, and thus the first voltage line L1 is connected to the feedback control line $21_i$ instead of the second voltage line L2. The connection of the first voltage line L1 to the feedback control line $21_i$ causes a LOW voltage to be applied to the feedback control line $21_i$. That is, with the second band lower than the operating band of the amplifying transistor 14, the potential of the feedback control line $21_i$ is switched to LOW level at time t14 to turn off the feedback transistor 11. In this example, the control signal Tp is also switched to LOW level at time t14, and thus the voltage of the second voltage line L2 is returned to a HIGH voltage at time t14.

The kTC noise remaining on the charge-storage node FD at the time of turn-off of the feedback transistor 11 is given by the root sum square of the kTC noise arising from the reset transistor 12 and the kTC noise arising from the feedback transistor 11. The kTC noise on the feedback transistor 11 generated when noise reduction by feedback is provided is $(Cfd/Cs)^{1/2}$ times the kTC noise on the reset transistor 12 generated when noise reduction by feedback is not provided, where Cs is the capacitance value of the capacitor C2. Considering this point, the kTC noise when feedback is present is reduced to $(1+(1+A\times B)\times(Cfd/(Cs\times B^2)))^{1/2}/(1+A\times B)$ times in comparison to the kTC noise when feedback is not present.

Exposure/Readout Period

Next, at time t15, the address signal SEL is switched to HIGH level to turn on the address transistor 16. At this time, the first switch SW1 and the second switch SW2 of the voltage switching circuit 25 are respectively turned on and off and, for example, VDD is applied to the drain of the amplifying transistor 14. In this state, the amplifying transistor 14 and the constant current source 27 form a source follower circuit. At this time, the vertical signal line 26 has a potential corresponding to the signal charge stored at the charge-storage node FD. The amplification factor of this source follower circuit is set to, for example, approximately 1.

The voltage at the charge-storage node FD at time t15 has changed from the reference voltage used in reset operation (the voltage VR2) by an amount corresponding to the amount of electrical signal generated by the photoelectric converter 20 during the period from time t14 to time t15. The voltage at the charge-storage node FD is amplified by the amplifier 2 (by an amplification factor of approximately 1 in this case), and then output to the vertical signal line 26 (time t16).

Random noise means fluctuations in output signal when photoelectric converter 20 generates no electrical signal through photoelectric conversion, that is, kTC noise. In this example, the kTC noise is reduced to $(1+(1+A \times B) \times (Cfd/(Cs \times B^2)))^{1/2}/(1+A \times B)$ times in the noise reduction period. Further, the amplification factor in the exposure/readout period is approximately 1. This allows a signal with reduced random noise to be read out from the vertical signal line 26. As a result, image data of favorable quality with reduced random noise can be obtained.

In this example, the ramp voltage generated by the voltage generation circuit 80 is a voltage that generally decreases in the period from time t13 to time t14. However, a voltage that generally increases in the period from time t13 to time t14 may be used as the ramp voltage. Any voltage that changes so as to cross over the threshold VTf of the feedback transistor 11 may be used as the ramp voltage according to embodiments of the present disclosure. The ramp voltage may not necessarily be a voltage that changes from a HIGH level gate potential to a LOW level gate potential (or from a LOW level gate potential to a HIGH level gate potential). For example, the ramp voltage may be a voltage that transitions, with time, between a voltage V3 lower than HIGH level, and a voltage V4 lower than the voltage V3 and higher than LOW level. Narrower ranges of voltage change advantageously lead to shorter time required for noise cancellation. If the threshold VTf of the feedback transistor 11 of each unit pixel cell 10A falls within the range of change in ramp voltage, noise cancellation can be executed irrespective of variations in threshold VTf among individual feedback transistors 11. The range of change in ramp voltage is, for example, several hundreds mV.

Hereinafter, other specific exemplary circuit configurations of a unit pixel cell will be described with reference to FIGS. 4 to 8.

Figure 4:
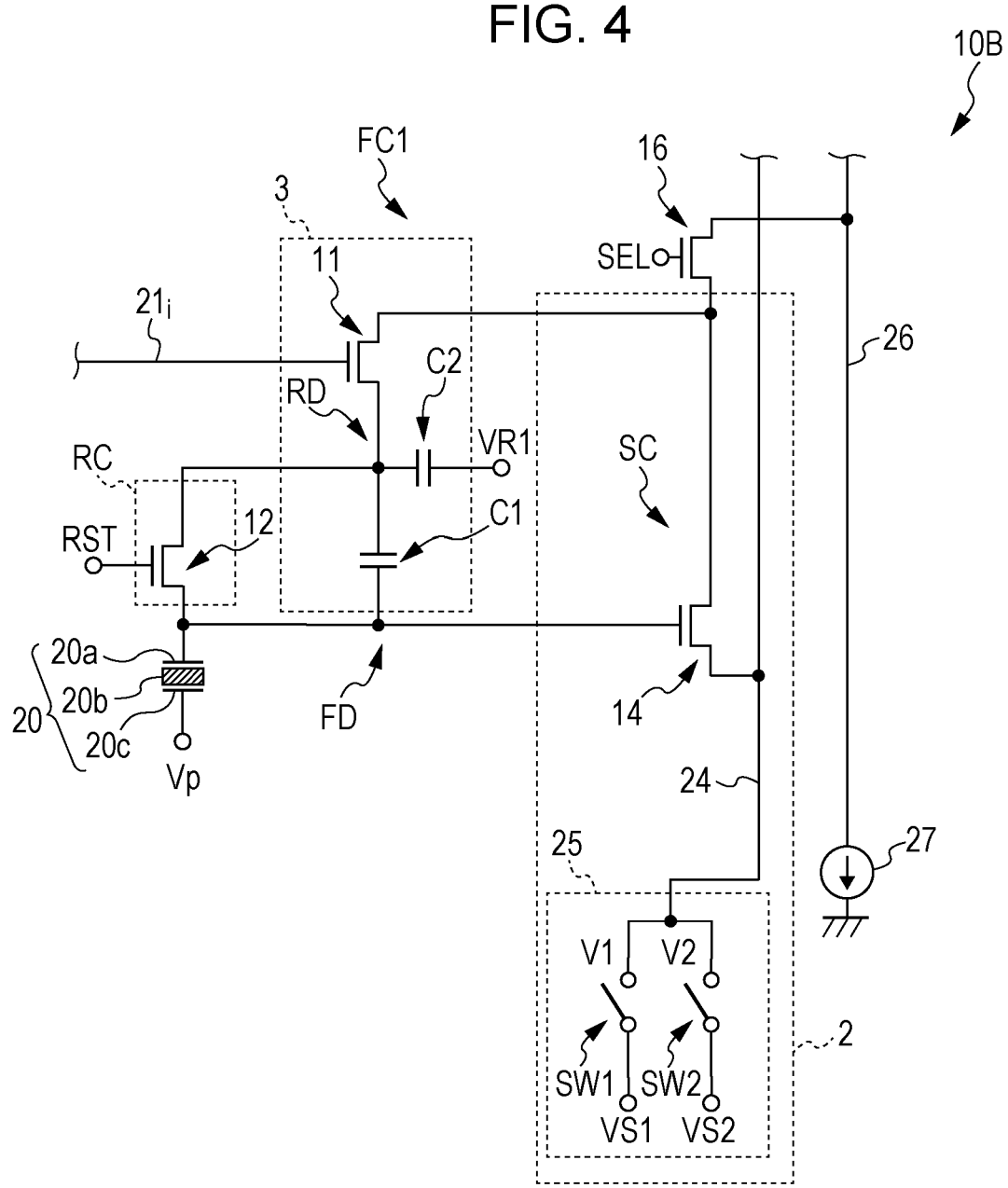
FIG. 4 illustrates another exemplary circuit configuration of a unit pixel cell.

FIG. 4 illustrates another exemplary circuit configuration of a unit pixel cell. In a unit pixel cell 10B illustrated in FIG. 4, the reset transistor 12 is connected in parallel with the capacitor C1. That is, in this example, one of the source and drain of the reset transistor 12 is connected to the charge-storage node FD, and the other is connected to the reset drain node.

In the exemplary configuration illustrated in FIG. 4, the output signal of the amplifying transistor 14 is used as the reference voltage used in reset operation. This can eliminate a power line which is located between, for example, the vertical scanning circuit 70A and the source or drain of the reset transistor 12 and supplies the voltage VR2. That is, the number of wires connected to the unit pixel cell 10B can be reduced. The operating timing of each individual transistor in the exemplary configuration illustrated in FIG. 4 may be the same as the operating timing in the case of the unit pixel cell 10A.

Figure 5:
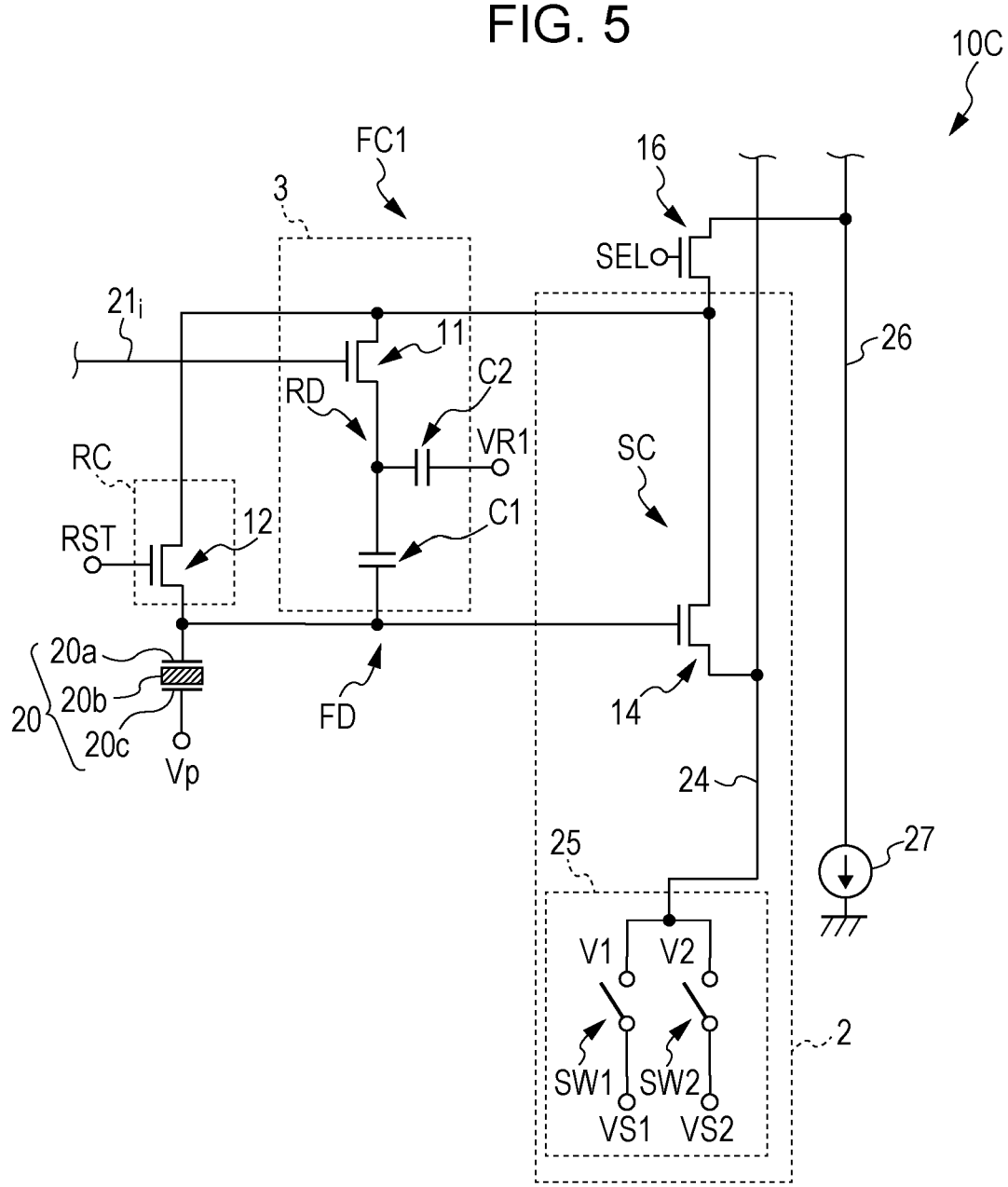
FIG. 5 illustrates still another exemplary circuit configuration of a unit pixel cell.

FIG. 5 illustrates still another exemplary circuit configuration of a unit pixel cell. In a unit pixel cell 10C illustrated in FIG. 5, one of the source and drain of the reset transistor 12 which is not connected to the charge-storage node FD is connected to one of the source and drain of the feedback transistor 11 which is not connected to the reset drain node RD. This configuration can reduce changes in the voltage of the charge-storage node FD before and after the turn-off action of the reset transistor 12. This allows for faster noise reduction. The operating timing of each individual transistor in the exemplary configuration illustrated in FIG. 5 may be the same as the operating timing in the case of the unit pixel cell 10A.

Figure 6:
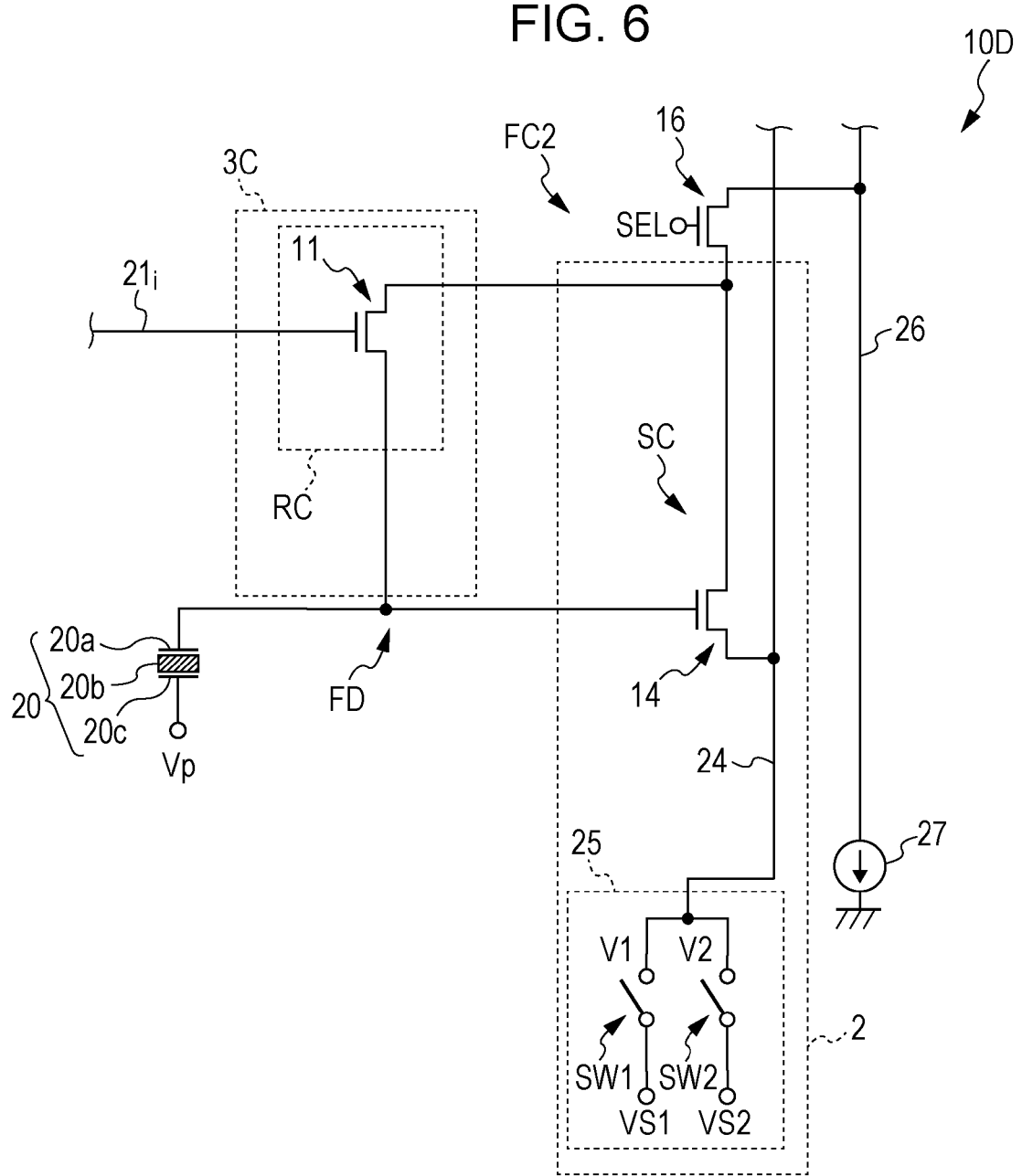
FIG. 6 illustrates still another exemplary circuit configuration of a unit pixel cell.

FIG. 6 illustrates still another exemplary circuit configuration of a unit pixel cell. Like the unit pixel cells 10A to 10C mentioned above, a unit pixel cell 10D illustrated in FIG. 6 has a feedback circuit FC2 which negatively feeds back the output signal of the signal detection circuit SC.

The feedback circuit FC2 partially includes a band control circuit 3C. The band control circuit 3C has the feedback transistor 11. In the exemplary configuration illustrated in FIG. 6, one of the input terminal and output terminal (one of the source and drain in this case) of the feedback transistor 11 is connected to the charge-storage node FD, and the other is connected to the node between the amplifying transistor 14 and the address transistor 16.

The feedback transistor 11 functions as a switching element that switches whether or not to apply a reference voltage used in reset operation to the charge-storage node FD. That is, in the exemplary configuration illustrated in FIG. 6, the feedback transistor 11 also has a function similar to the reset transistor 12 in each of the unit pixel cells 10A to 10C mentioned above, and forms a part of the reset circuit RC that initializes a signal generated by the photoelectric converter 20. That is, in this example, the reset circuit RC constitutes a part of a feedback loop in the feedback circuit FC2. The exemplary circuit configuration illustrated in FIG. 6 allows for reduced number of transistors in each unit pixel cell in comparison to the unit pixel cells 10A to 10C mentioned above.

The operating timing of the feedback transistor 11 in the exemplary configuration illustrated in FIG. 6 may be substantially the same as the operating timing in the case of the unit pixel cell 10A. In the exemplary configuration illustrated in FIG. 6, with the address transistor 16 in OFF state, the feedback transistor 11 is turned on, and with the first switch SW1 and the second switch SW2 respectively turned on and turned off, a voltage of, for example, 0 V is applied to the amplifying transistor 14 to reset the charge-storage node FD (corresponding to time t11 in FIG. 3). The reference voltage used in reset operation is the output signal of the amplifying transistor 14. The operating band of the feedback transistor 11 at this time is the first band.

Figure 7:
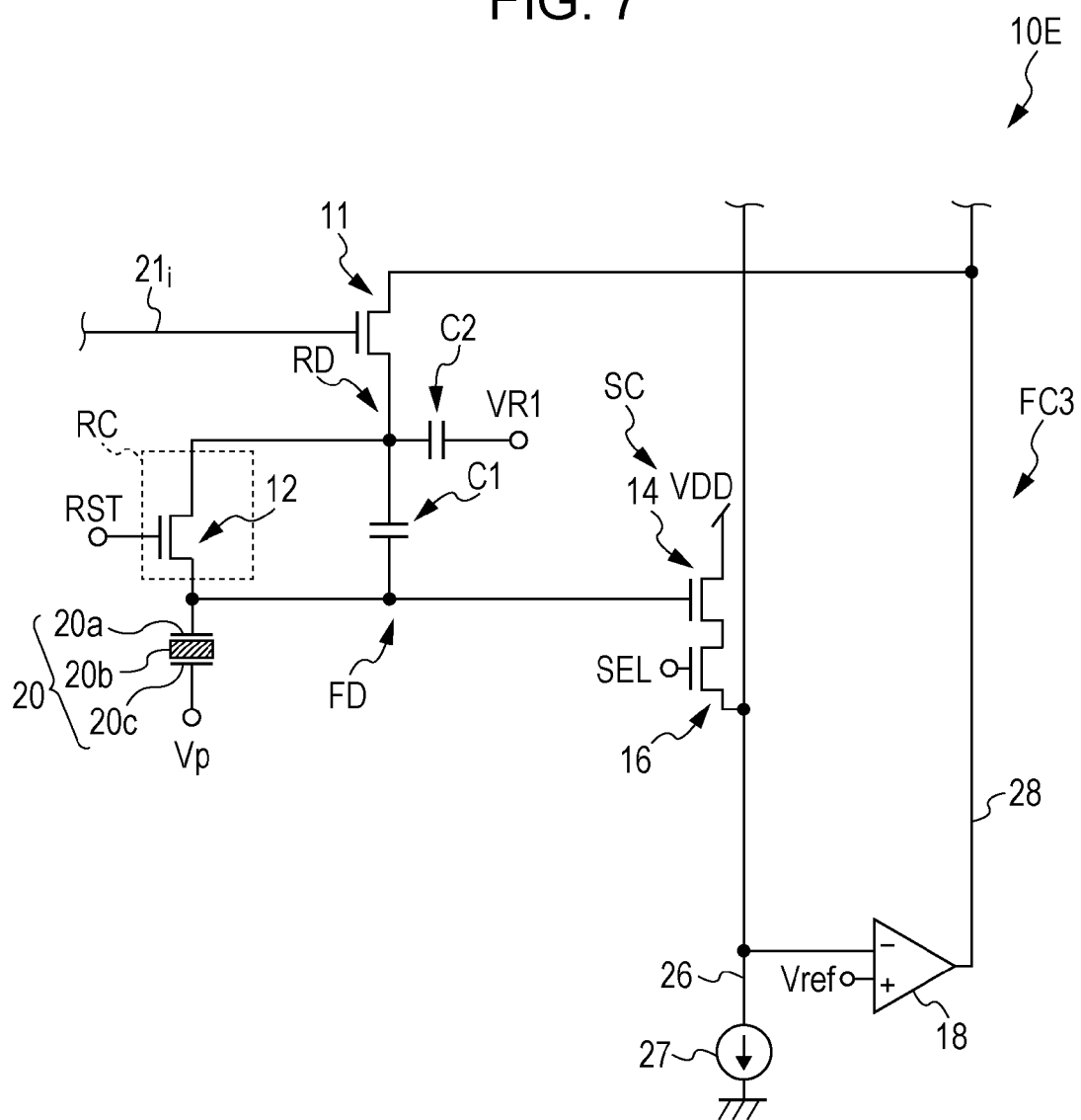
FIG. 7 illustrates still another exemplary circuit configuration of a unit pixel cell.

FIG. 7 illustrates still another exemplary circuit configuration of a unit pixel cell. In the exemplary configuration illustrated in FIG. 7, a feedback circuit FC3 for negatively feeding back the output signal of the signal detection circuit SC includes an inverting amplifier 18 disposed in a peripheral circuit.

In a unit pixel cell 10E illustrated in FIG. 7, VDD is applied to the drain of the amplifying transistor 14 when the imaging device is in operation. The source of the amplifying transistor 14 is connected to the drain of the address transistor 16, and the source of the address transistor 16 is connected to the vertical signal line 26. The vertical signal line 26 may have a connection with two or more unit pixel cells 10E.

The inverting amplifier 18 is disposed for, for example, each of columns of the unit pixel cells 10E arranged two-dimensionally. As illustrated in FIG. 7, the negative-side input terminal of the inverting amplifier 18 is connected to the corresponding vertical signal line 26. The positive-side input terminal of the inverting amplifier 18 receives supply of a predetermined voltage (for example, a positive voltage of 1 V or in the vicinity of 1 V) Vref. This voltage Vref is used as a reference voltage in reset operation. The output terminal of the inverting amplifier 18 is connected, via a feedback line 28 corresponding to each column, to at least one unit pixel cell 10E having a connection with the negative-side input terminal of the inverting amplifier 18. More specifically, one of the source and drain of the feedback transistor 11 which is not connected to the reset drain node RD is connected to the feedback line 28.

In this example, a feedback loop is formed for one of the unit pixel cells 10E sharing the feedback line 28. That is, in this example, among the unit pixel cells 10E sharing the feedback line 28, a feedback loop is formed for one unit pixel cell 10E that is selected by the turn-on action of the address transistor 16, and noise cancellation is executed. The inverting amplifier 18 constitutes a part of a feedback loop in the feedback circuit FC3. The inverting amplifier 18 may be referred to as feedback amplifier.

In the exemplary configuration illustrated in FIG. 7, the operating timing of each individual transistor excluding the address transistor 16 may be the same as the operating timing in the case of the unit pixel cell 10A. A ramp voltage is used as the gate voltage of the feedback transistor 11 to avoid abrupt ON/OFF action of the transistor, thus reducing noise associated with the ON/OFF action of the transistor. The formation of a feedback loop allows the magnitude of kTC noise to be reduced to $1/(1+A)$, where A is the gain of the feedback circuit FC3. In this way, formation of a feedback loop may be executed for each individual column of the pixel array 90.

Figure 8:
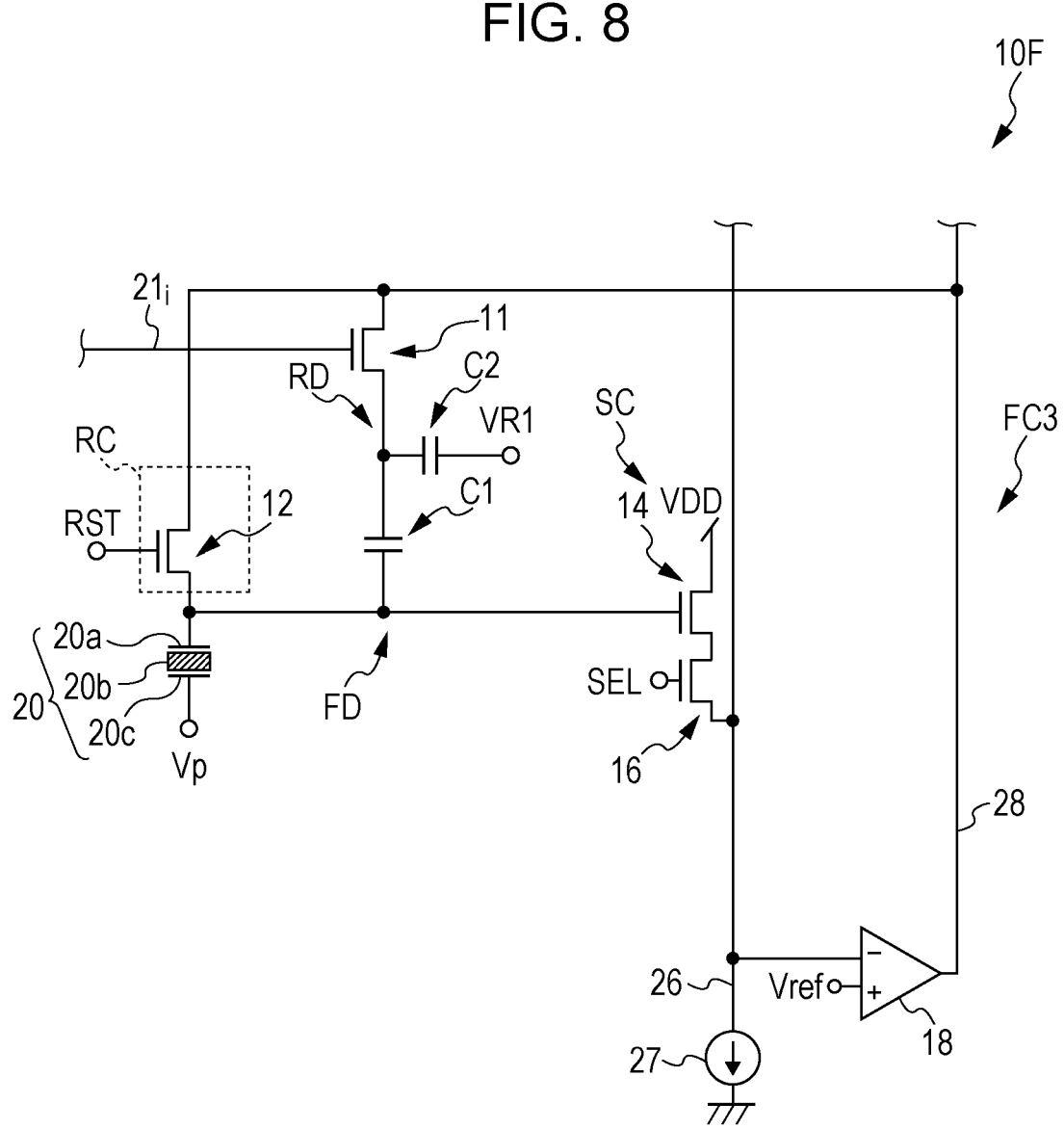
FIG. 8 illustrates still another exemplary circuit configuration of a unit pixel cell.

FIG. 8 illustrates still another exemplary circuit configuration of a unit pixel cell. Like the unit pixel cell 10C described above with reference to FIG. 5, in a unit pixel cell 10F illustrated in FIG. 8, one of the source and drain of the reset transistor 12 which is not connected to the charge-storage node FD is connected to one of the source and drain of the feedback transistor 11 which is not connected to the reset drain node RD. As in the circuit configuration illustrated in FIG. 7, in the circuit configuration illustrated in FIG. 8, formation of a feedback loop is executed for one of the unit pixel cells 10F sharing the feedback line 28.

Modification of First Embodiment

Figure 9:
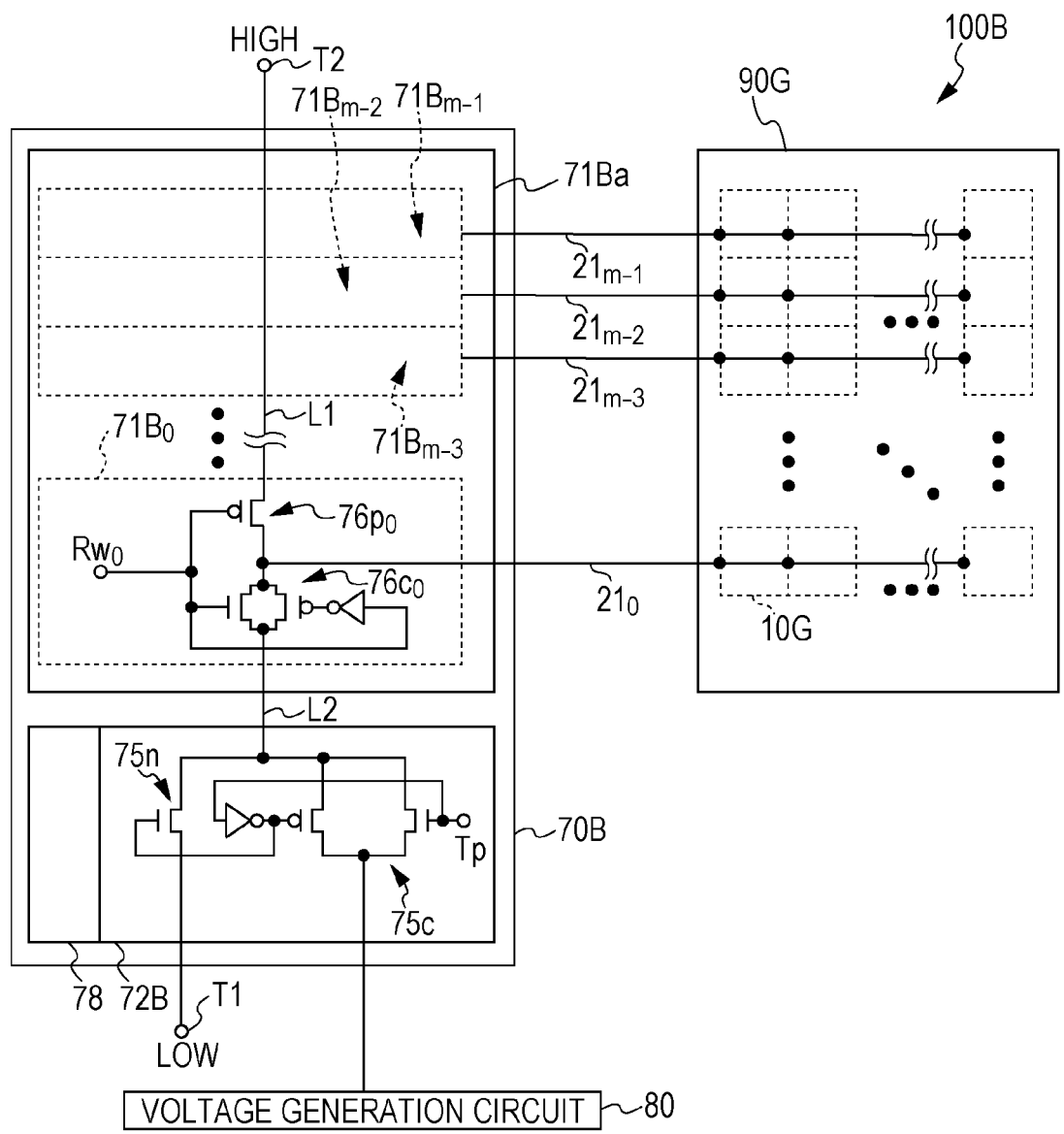
FIG. 9 illustrates another exemplary configuration of the imaging device according to the first embodiment of the present disclosure.

FIG. 9 illustrates another exemplary configuration of the imaging device according to the first embodiment of the present disclosure. An imaging device 100B illustrated in FIG. 9 differs from the imaging device 100A described above with reference to FIG. 1 mainly in that the imaging device 100B has a vertical scanning circuit 70B instead of the vertical scanning circuit 70A.

As illustrated in FIG. 9, the vertical scanning circuit 70B includes a row driver array 71Ba including a plurality of row drivers $71B_i$, a voltage switching circuit 72B, the control circuit 78, the first voltage line L1, and the second voltage line L2. In this example, the first voltage line L1 and the second voltage line L2 are respectively connected to the second terminal T2 and the voltage switching circuit 72B. That is, in this example, a HIGH voltage is applied to the first voltage line L1 when the imaging device 100B is in operation.

The voltage switching circuit 72B is connected to the voltage generation circuit 80 and the first terminal T1. The voltage switching circuit 72B is capable of switching whether to apply a LOW voltage to the second voltage line L2, or to apply a ramp voltage to the second voltage line L2. In this example, the voltage switching circuit 72B has a CMOS switch 75c connected between the voltage generation circuit 80 and the second voltage line L2, and an nMOS switch 75n connected between the first terminal T1 and the second voltage line L2. The ON and OFF action of each of the CMOS switch 75c and the nMOS switch 75n is controlled by the control signal Tp. Like the CMOS switch 73c and the pMOS switch 73p in the voltage switching circuit 72A (see FIG. 1) mentioned above, the CMOS switch 75c and the nMOS switch 75n in the voltage switching circuit 72B operate in a complementary manner. That is, when the CMOS switch 75c is ON, a connection is established between the voltage generation circuit 80 and the second voltage line L2, and a ramp voltage is supplied to the second voltage line L2 via the voltage switching circuit 72B. When the CMOS switch 75c is OFF, the nMOS switch 75n is turned on, and thus a connection is established between the first terminal T1 and the second voltage line L2, causing a LOW voltage to be supplied to the second voltage line L2.

In this example, each of the row drivers $71B_i$ connected to at least one unit pixel cell 10G belonging to the i-th row by the feedback control line $21_i$ is connected to the first voltage line L1 that supplies a HIGH voltage, and the second voltage line L2 that supplies a LOW voltage. Accordingly, when the imaging device 100B is in operation, each of the row drivers $71B_i$ either receives supply of a HIGH voltage and a ramp voltage or receives supply of a HIGH voltage and a LOW voltage, depending on the ON or OFF state of the CMOS switch 75c and the nMOS switch 75n of the voltage switching circuit 72B.

In the exemplary configuration illustrated in FIG. 9, each of the row drivers $71B_i$ has a CMOS switch $76c_i$ connected between the voltage switching circuit 72B and the feedback control line $21_i$, and a pMOS switch $76p_i$ connected between the second terminal T2 and the feedback control line $21_i$. The CMOS switch $76c_i$ and the pMOS switch $76p_i$ in each of the row drivers $71B_i$ operate in a complementary manner based on the control signal $Rw_i$. Accordingly, when the CMOS switch $76c_i$ is ON, a connection is established between the second voltage line L2 and the feedback control line $21_i$, and depending on whether the control signal Tp is at HIGH level or LOW level, either a ramp voltage or a LOW voltage is supplied to the feedback control line $21_i$. When the CMOS switch $76c_i$ is OFF, the pMOS switch $76p_i$ is turned on. This cause a connection to be established between the first voltage line L1 and the feedback control line $21_i$, and a HIGH voltage is supplied to the feedback control line $21_i$.

In this way, a common voltage line may be used to supply a ramp voltage and a LOW voltage so that one of a ramp voltage and a LOW voltage is selectively applied to the row driver $71B_i$ via this common voltage line (the second voltage line L2). This configuration also enables selective application of one of a HIGH voltage, a LOW voltage, and a ramp voltage with less noise, to the feedback control line $21_i$. This configuration also allows for reduced number of switching elements in each row driver, thus reducing capacitive coupling due to transistors.

In this example, the pixel array 90G in the imaging device 100B is made up of a plurality of unit pixel cells 10G. Each of the unit pixel cells 10G has a configuration similar to the configuration described above with reference to FIG. 2, except for that the feedback transistor 11 is a P-channel MOS. When a P-channel MOS is used as the feedback transistor 11, a configuration similar to each of the unit pixel cells 10B to 10F described above with reference to FIGS. 4 to 8 may be employed instead of the unit pixel cell 10G.

Second Embodiment

Figure 10:
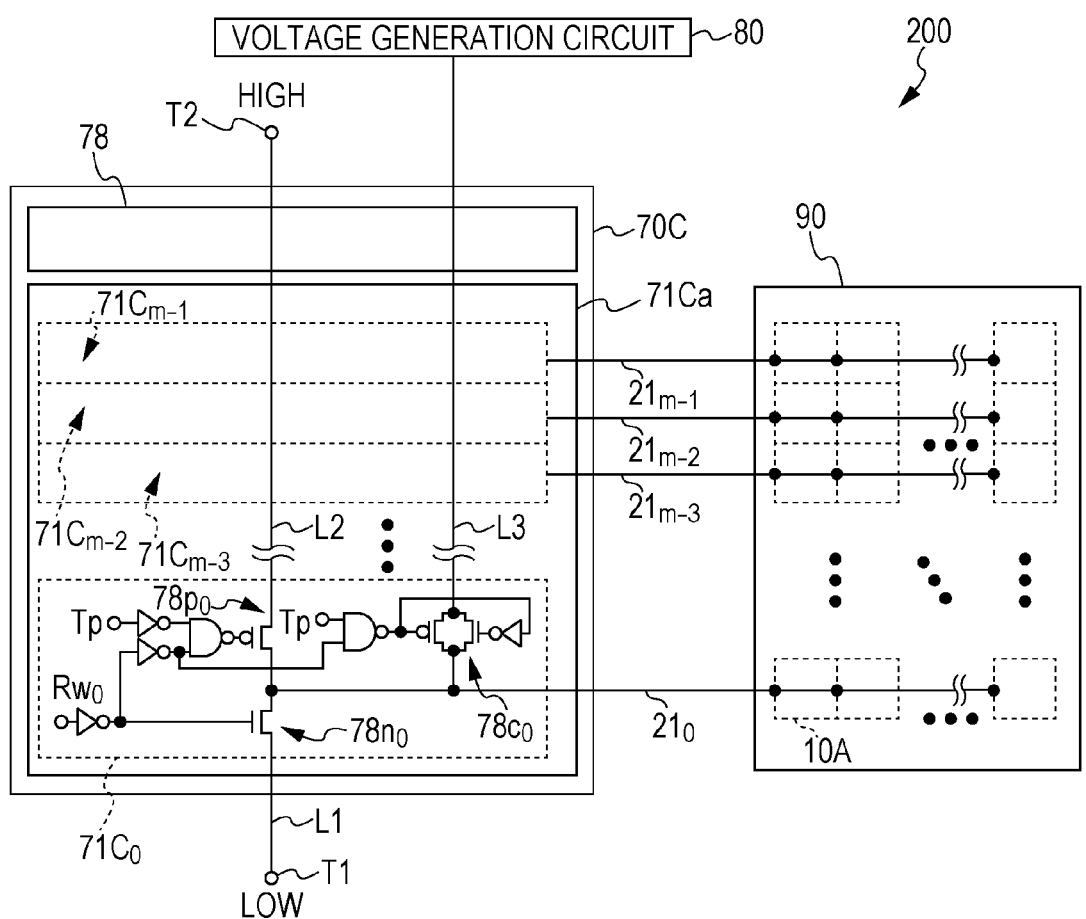
FIG. 10 illustrates an exemplary configuration of an imaging device according to a second embodiment of the present disclosure.

FIG. 10 illustrates an exemplary configuration of an imaging device according to a second embodiment of the present disclosure. An imaging device 200 illustrated in FIG. 10 differs from the imaging device 100A described above with reference to FIG. 1 mainly in that the imaging device 200 has a vertical scanning circuit 70C instead of the vertical scanning circuit 70A.

As illustrated in FIG. 10, the vertical scanning circuit 70C includes a row driver array 71Ca including a plurality of row drivers $71C_i$, the control circuit 78, the first voltage line L1, the second voltage line L2, and a third voltage line L3. The first voltage line L1 is connected between the row driver $71C_i$, which has a connection with the feedback control line $21_i$, and the first terminal T1. The second voltage line L2 is connected between the row driver $71C_i$ and the second terminal T2. As illustrated in FIG. 10, the row driver $71C_i$ has a connection with the third voltage line L3. The third voltage line L3 is connected to the voltage generation circuit 80. That is, when the imaging device 200 is in operation, the row driver $71C_i$ receives supply of a LOW voltage, a HIGH voltage, and a ramp voltage respectively via the first voltage line L1, the second voltage line L2, and the third voltage line L3.

Each of the row drivers $71C_i$ is capable of selectively connecting one of the first voltage line L1, the second voltage line L2, and the third voltage line L3, to the feedback control line $21_i$ connected to at least one unit pixel cell 10A belonging to the i-th row of the pixel array 90. In this example, each of the row drivers $71C_i$ has an nMOS switch $78n_i$ connected between the first terminal T1 and the feedback control line $21_i$, a pMOS switch $78p_i$ connected between the second terminal T2 and the feedback control line $21_i$, and a CMOS switch $78c_i$ connected between the voltage generation circuit 80 and the feedback control line $21_i$.

The nMOS switch $78n_i$, the pMOS switch $78p_i$, and the CMOS switch $78c_i$, which operate based on the control signal $Rw_i$ and the control signal Tp, establish a connection between the feedback control line $21_i$ and one of the first voltage line L1, the second voltage line L2, and the third voltage line L3. In the exemplary configuration illustrated in FIG. 10, when the control signal $Rw_i$ is at LOW level, only the nMOS switch $78n_i$ out of the nMOS switch $78n_i$, the pMOS switch $78p_i$, and the CMOS switch $78c_i$ is turned on. A connection is thus established between the first voltage line L1 and the feedback control line $21_i$. Accordingly, a LOW voltage is supplied to the feedback control line $21_i$ at this time. When the control signal $Rw_i$ is at HIGH level and the control signal Tp is at LOW level, only the pMOS switch $78p_i$ is turned on, and a connection is established between the second voltage line L2 and the feedback control line $21_i$. Accordingly, a HIGH voltage is supplied to the feedback control line $21_i$. When the control signal $Rw_i$ and the control signal Tp are both at HIGH level, only the CMOS switch $78c_i$ is turned on, and thus a connection is established between the third voltage line L3 and the feedback control line $21_i$, and a ramp voltage is supplied to the feedback control line $21_i$.

In this way, the first voltage line L1 that supplies a LOW voltage to the row driver $71C_i$, the second voltage line L2 that supplies a HIGH voltage to the row driver $71C_i$, and the third voltage line L3 that supplies a ramp voltage to the row driver $71C_i$ may be provided individually. Further, within the row driver $71C_i$, one of these power lines may be selectively connected to the feedback control line $21_i$ so as to supply each voltage to each of the unit pixel cells 10A. When a voltage line that supplies a LOW voltage, a voltage line that supplies a HIGH voltage, and a voltage line that supplies a ramp voltage are provided individually, a row that receives supply of a LOW voltage, a row that receives supply of a HIGH voltage, and a row that receives supply of a ramp voltage are allowed to coexist within the pixel array 90. This leads to shorter time required to cancel noise for the entire pixel array 90. The second embodiment thus allows for faster operation of the imaging device.

In this example, the pixel array 90 in the imaging device 200 is made up of a plurality of unit pixel cells 10A. Of course, instead of the unit pixel cell 10A, any one of the unit pixel cells 10B to 10F described above with reference to FIGS. 4 to 8 may be employed.

The above embodiments are directed to a case in which the reset transistor 12, the amplifying transistor 14, and the address transistor 16 are N-channel MOSs. However, transistors according to the embodiments of the present disclosure are not limited to N-channel MOSs. The reset transistor 12, the amplifying transistor 14, and the address transistor 16 may be P-channel MOSs. Further, not all of the feedback transistor 11, the reset transistor 12, the amplifying transistor 14, and the address transistor 16 may necessarily be N-channel MOSs or P-channel MOSs. Other than FETs, bipolar transistors may be also used as transistors.

The voltage switching circuits 72A and 72B, and the row drivers $71A_i$, $71B_i$ and $71C_i$ may not necessarily be configured as described above with reference to the drawings. The drawings are only illustrative of exemplary configurations, and any other combinations of pMOS switches, nMOS switches, and CMOS switches that enable switching of voltages may be employed. Alternatively, switching elements other than pMOS switches, nMOS switches, and CMOS switches may be employed.

Third Embodiment

Figure 11:
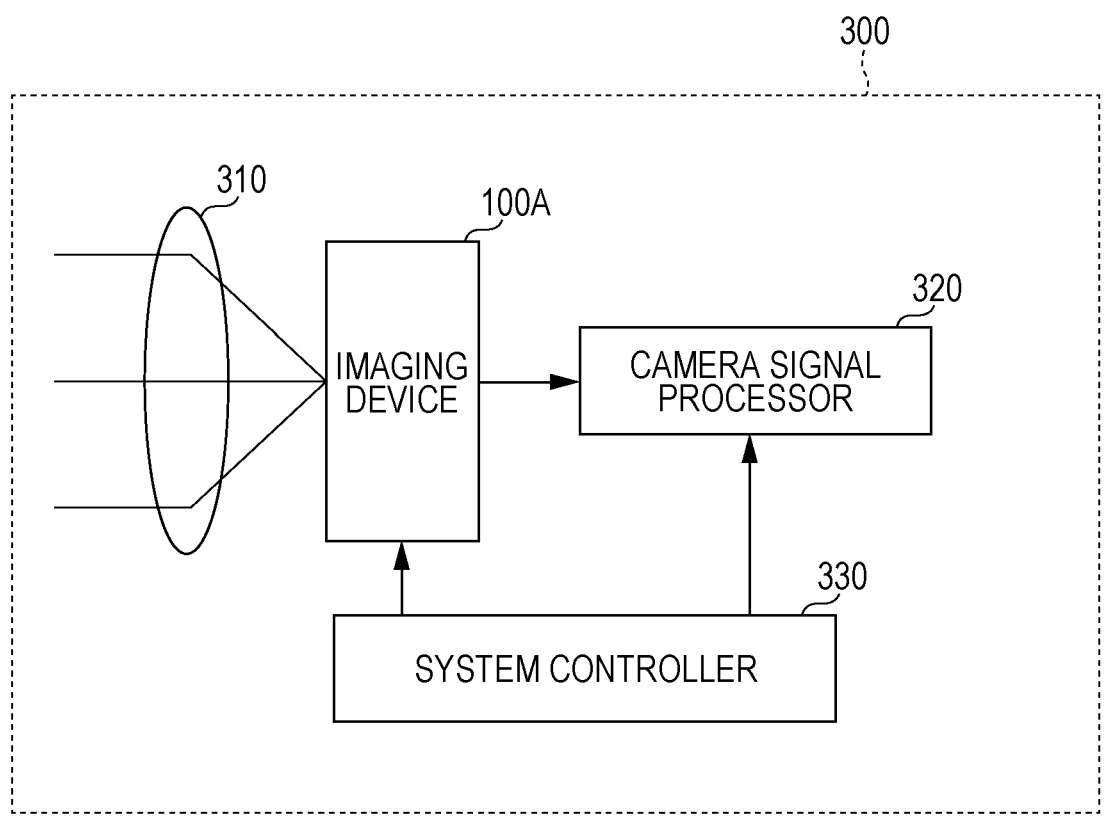
FIG. 11 schematically illustrates an exemplary configuration of a camera system according to a third embodiment of the present disclosure.

FIG. 11 schematically illustrates an exemplary configuration of a camera system according to a third embodiment of the present disclosure. A camera system 300 illustrated in FIG. 11 has a lens optical system 310, the imaging device 100A described above with reference to FIG. 1, a system controller 330, and a camera signal processor 320.

The lens optical system 310 includes, for example, an autofocus lens, a zoom lens, and an aperture. The lens optical system 310 focuses light on the imaging surface of the imaging device 100A.

The system controller 330 controls the entire camera system 300. The system controller 330 may be implemented by, for example, a microcomputer.

The camera signal processor 320 functions as a signal processing circuit that processes an output signal received from the imaging device 100A. The camera signal processor 320 performs processing including, for example, gamma correction, color interpolation, spatial interpolation, and auto white balance. The camera signal processor 320 may be implemented by, for example, a digital signal processor (DSP).

The imaging device 100A in the camera system 300 is capable of supplying a low-noise ramp voltage to the feedback transistor 11 of each unit pixel cell. The influence of noise is thus reduced in the camera system 300. This enables accurate readout of electrical charge, thus providing images with favorably quality. Instead of the imaging device 100A, any one of the imaging device 1006 described above with reference to FIG. 9, and the imaging device 200 described above with reference to FIG. 10 may be used.

The embodiments of the present disclosure enable reduction of shading. The imaging device according to the present disclosure may be applied to various camera systems, such as digital still cameras, medical cameras, surveillance cameras, vehicle-mounted cameras, digital single-lens reflex cameras, and digital mirrorless cameras, and sensor systems.

What is claimed is:

1. An imaging device comprising:
   a first terminal to which a first voltage is applied;
   a second terminal to which a second voltage different from the first voltage is applied;
   a voltage generator generating a ramp voltage which is a voltage varying with time;
   a first switching circuit connected to the second terminal and the voltage generator;
   a second switching circuit connected to the first terminal and the first switching circuit, and
   pixels each including a photoelectric converter generating a signal, and a signal detection circuit detecting the signal, at least one of the pixels connected to the second switching circuit, wherein
   the first switching circuit selectively connects one of the second terminal and the voltage generator with the second switching circuit, and
   the second switching circuit selectively connects one of the first voltage terminal and the first switching circuit with the at least one of the pixels.

2. The imaging device according to claim 1, wherein the second voltage is higher than the first voltage.

3. The imaging device according to claim 1, wherein the pixels each further include a reset circuit initializing the signal.

4. The imaging device according to claim 3, further comprising a feedback circuit that negatively feeds back an output of the signal detection circuit to the photoelectric converter through a feedback loop, wherein the reset circuit constitutes a part of the feedback loop.

5. The imaging device according to claim 4, wherein
   the reset circuit includes a first transistor having an input terminal, an output terminal and a control terminal,
   one of the input terminal and the output terminal is connected to the photoelectric converter, and
   the control terminal is connected to the second switching circuit.

6. The imaging device according to claim 3, further comprising a feedback circuit that negatively feeds back an output of the signal detection circuit to the photoelectric converter through a feedback loop, wherein
   the feedback circuit includes a first transistor constituting a part of the feedback loop, the first transistor having a control terminal connected to the second switching circuit, and
   the reset circuit includes a second transistor having an input terminal and an output terminal, one of the input terminal and the output terminal connected to the photoelectric converter.

7. The imaging device according to claim 1, wherein the ramp voltage is a voltage that increases with time between the first voltage and the second voltage.

8. The imaging device according to claim 1, wherein the ramp voltage is a voltage that decreases with time between the first voltage and the second voltage.

\* \* \* \* \*